US011016254B2

(12) United States Patent
Lin et al.

(10) Patent No.: US 11,016,254 B2
(45) Date of Patent: May 25, 2021

(54) WEARABLE DEVICE, OPTICAL MODULE AND DRIVING METHOD THEREOF

(71) Applicants: Beijing BOE Optoelectronics Technology Co., Ltd., Beijing (CN); BOE TECHNOLOGY GROUP CO., LTD., Beijing (CN)

(72) Inventors: Lin Lin, Beijing (CN); Jian Sun, Beijing (CN); Ziqiang Guo, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/760,559

(22) PCT Filed: Oct. 10, 2019

(86) PCT No.: PCT/CN2019/110485
§ 371 (c)(1),
(2) Date: Apr. 30, 2020

(87) PCT Pub. No.: WO2020/083033
PCT Pub. Date: Apr. 30, 2020

(65) Prior Publication Data
US 2020/0292767 A1  Sep. 17, 2020

(30) Foreign Application Priority Data
Oct. 23, 2018  (CN) .......................... 201811238950.2

(51) Int. Cl.
*G02B 6/42* (2006.01)
(52) U.S. Cl.
CPC ................................. *G02B 6/4274* (2013.01)

(58) Field of Classification Search
CPC ................................................... G02B 6/4274
See application file for complete search history.

(56) References Cited

U.S. PATENT DOCUMENTS

| 9,628,191 B2 | 4/2017 | Xie et al. |
| 2003/0123500 A1 | 7/2003 | Fujita |
| (Continued) | | |

FOREIGN PATENT DOCUMENTS

| CN | 202818303 U | 3/2013 |
| CN | 104919347 A | 9/2015 |
| (Continued) | | |

OTHER PUBLICATIONS

International Search Report and Written Opinion dated Dec. 31, 2019 for PCT Patent Application No. PCT/CN2019/110485.

(Continued)

*Primary Examiner* — Sung H Pak
*Assistant Examiner* — Hoang Q Tran
(74) *Attorney, Agent, or Firm* — Thomas | Horstemeyer, LLP

(57) ABSTRACT

An optical module includes an optical transmitting assembly and a driver. The optical transmitting assembly is configured to emit an optical signal based on a driving current. The driver includes a calibration circuit and a driving current setting circuit. The calibration circuit is configured to obtain an original monitoring current feedback value $MONDAC_{before}$ corresponding to a monitoring current of the optical transmitting assembly, obtain a tracking error value TE of a current temperature relative to a reference temperature, and calibrate the original monitoring current feedback value $MONDAC_{before}$ based on the tracking error value to obtain a calibrated monitoring current feedback value $MONDAC_{after}$. The driving current setting circuit is configured to set the driving current based on the calibrated (Continued)

monitoring current feedback value $MONDAC_{after}$ to control the optical power output by the optical transmitting assembly.

20 Claims, 5 Drawing Sheets

(56) References Cited

U.S. PATENT DOCUMENTS

| | | |
|---|---|---|
| 2004/0131094 A1 | 7/2004 | Miremadi |
| 2016/0241343 A1 | 8/2016 | Xie et al. |
| 2020/0136349 A1* | 4/2020 | Igawa .................. H04B 10/564 |

FOREIGN PATENT DOCUMENTS

| | | |
|---|---|---|
| CN | 105977782 A | 9/2016 |
| CN | 106451061 A | 2/2017 |
| CN | 207069286 U | 3/2018 |
| CN | 207475556 U | 6/2018 |
| CN | 106451061 B | 12/2018 |
| CN | 110447151 A | 11/2019 |
| JP | 2005150620 A | 6/2005 |
| JP | WO2018179306 A1 | 7/2019 |
| WO | 2016127375 A1 | 8/2016 |
| WO | 2018179306 A1 | 10/2018 |
| WO | WO-2018179306 A1 * | 10/2018 ........... H04B 10/564 |

OTHER PUBLICATIONS

1st Office Action dated Sep. 1, 2020 for Chinese Patent Application No. 201811238950.2.

* cited by examiner

WEARABLE DEVICE, OPTICAL MODULE AND DRIVING METHOD THEREOF

CROSS-REFERENCE TO RELATED APPLICATIONS

The present application is a national phase application under 35 U.S.C. § 371 of International Patent Application No. PCT/CN2019/110485, filed on Oct. 10, 2019, which claims the benefit of and priority to Chinese Patent Application No. 201811238950.2 filed on Oct. 23, 2018 and entitled "Optical Module and Temperature Compensation Method Thereof," the entire contents of which are incorporated herein by reference.

TECHNICAL FIELD

The present disclosure relates to optical communication and, more particularly, to a wearable device, an optical module, and a driving method thereof.

BACKGROUND

Wearable devices, such as Virtual Reality (VR) or Augmented Reality (AR) devices, need a high-speed flow of data to be transmitted to servers or other processors in order to obtain and provide a good sense of immersion and user experience. Due to the continuous increase in transmission capacity and rate, the existing common transmission mode/agreement standard MIPI (Mobile Industry Processor Interface), HDMI (High-Definition Multi-Face Interface), and the like may not meet the requirements for use as the transmission rate is difficult to exceed 20 Gbps. Optical modules are connected to transmit through an optical fiber, then the transmission rate may easily achieve 40 Gbps/100 Gbps, and the 400 Gbps upgrade is also being tested. Therefore, the use of the optical fiber communication is bound to become the main transmission mode of the VR or AR device.

MSA (Multi-Source Agreement) is a multi-source agreement for small hot-pluggable optical transceiver modules (optical modules for short). MSA unifies the optical transceiver package, and thus MSA-compliant optical transceivers are the main form of current optical transmitters and receivers. Because the size of the current devices using optical modules (such as the VR or AR devices) is getting smaller and smaller, an improved content of the MSA is miniaturization to meet the needs of new services and advanced technologies. Because the interface density of interface boards is getting higher and higher due to miniaturization, heat dissipation and temperature management become the focus of attention. As the core of the optical fiber access network device, the output characteristics of optical modules may be affected by temperature. Therefore, temperature compensation thereof becomes the top priority.

SUMMARY

According to a first aspect of the present disclosure, there is provided an optical module including:
an optical transmitting assembly configured to emit light based on a driving current to output optical power; and
a driver, including:
a calibration circuit configured to obtain an original monitoring current feedback value $MONDAC_{before}$, corresponding to a monitoring current of the optical transmitting assembly, obtaining a tracking error value TE of a current temperature relative to a reference temperature, and calibrating the original monitoring current feedback value $MONDAC_{before}$ based on the tracking error value TE to obtain a calibrated monitoring current feedback value $MONDAC_{after}$; and
a driving current setting circuit configured to set the driving current based on the calibrated monitoring current feedback value $MONDAC_{after}$ to control the optical power output by the optical transmitting assembly.

Optionally, the calibration circuit is configured to linearly calibrate the original monitoring current feedback value $MONDAC_{before}$ based on the tracking error value TE.

Optionally, the calibration circuit is configured to calibrate according to following Equation:

$$MONDAC_{after} = \frac{MONDAC_{before}}{10^{(\frac{TE}{10})}}.$$

Optionally, the calibration circuit is configured to calibrate according to following Equation:

$$MONDAC_{after} = 31 - \left(31 - \frac{MONDAC_{before}}{10^{(\frac{TE}{10})}}\right) \times 4.$$

Optionally, the driver is a circuit combining an analog circuit and a micro-control circuit.

Optionally, the optical module further includes a storage configured to store the tracking error value TE. The calibration circuit is configured to read the tracking error value TE from the storage.

Optionally, the original monitoring current feedback value $MONDAC_{before}$ is obtained by collecting an analog value $I_m$ of the monitoring current of the optical transmitting assembly and performing analog-to-digital conversion on the analog value $I_m$.

Optionally, the calibration circuit uses a 5-bit register and a shifter to implement the calculation of the following Equation:

$$MONDAC_{after} = 31 - \left(31 - \frac{MONDAC_{before}}{10^{(\frac{TE}{10})}}\right) \times 4.$$

Optionally, the calibration circuit uses an 8-bit register and a shifter to implement the calculation of the following Equation:

$$MONDAC_{after} = 31 - \left(31 - \frac{MONDAC_{before}}{10^{(\frac{TE}{10})}}\right) \times 4.$$

According to a second aspect of the present disclosure, there is provided a method for driving an optical module including following steps: obtaining an original monitoring current feedback value $MONDAC_{before}$ corresponding to a monitoring current of an optical transmitting assembly of the optical module; obtaining a tracking error value TE of a current temperature relative to a reference temperature; calibrating the original monitoring current feedback value $MONDAC_{before}$ based on the tracking error value TE to obtain a calibrated monitoring current feedback value MON- $DAC_{after}$; and setting a driving current based on the calibrated monitoring current feedback value $MONDAC_{after}$ to control an optical power output by the optical transmitting assembly.

Optionally, the calibrating the original monitoring current feedback value $MONDAC_{before}$ based on the tracking error value TE includes linearly calibrating the original monitoring current feedback value $MONDAC_{before}$ based on the tracking error value TE.

Optionally, the calibrated monitoring current feedback value $MONDAC_{after}$ is calculated according to following Equation:

$$MONDAC_{after} = \frac{MONDAC_{before}}{10^{(\frac{TE}{10})}}.$$

Optionally, the calibrated monitoring current feedback value $MONDAC_{after}$ is calculated according to following Equation:

$$MONDAC_{after} = 31 - \left(31 - \frac{MONDAC_{before}}{10^{(\frac{TE}{10})}}\right) \times 4.$$

Optionally, the obtaining the tracking error value TE of the current temperature relative to the reference temperature includes reading the tracking error value TE from a storage of the optical module.

Optionally, the original monitoring current feedback value $MONDAC_{after}$ is obtained by collecting an analog value $I_m$ of the monitoring current of the optical transmitting assembly and performing analog-to-digital conversion on the analog value $I_m$.

According to a third aspect of the present disclosure, there is provided a wearable device including the optical module according to the first aspect of the present disclosure.

BRIEF DESCRIPTION OF THE DRAWINGS

These and other features and advantages will be apparent by reading the following detailed description and careful review of the associated drawings. It should be understood that both the foregoing general description and the following detailed description are illustrative only and not restrictive of the claimed aspects.

DETAILED DESCRIPTION

Figure 1:
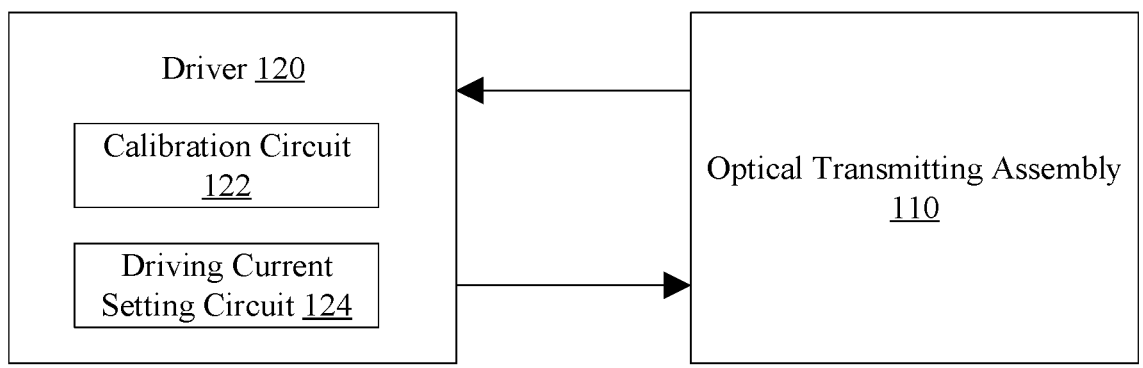
FIG. 1 illustrates a schematic structural view of an optical module according to an embodiment of the present disclosure.

Various embodiments are directed to an optical module and a driving method thereof. Unlike the normal use environment in network operators, the internal environment of a wearable device has poor ventilation and heat dissipation, but is relatively sealed. Therefore, when the optical module is applied to the wearable device, it has the characteristics of high component temperature, low noise, and high transmission signal quality. In this regard, the present disclosure proposes an optical module used in a wearable device environment, such as a VR and AR device and a driving method thereof, to maintain an output optical power temperature of the optical module.

An optical module is a device that realizes electro-optical conversion, and it outputs a desired optical power by controlling and adjusting the amount of a driving current of a light-emitting element in an optical transmitting assembly, wherein the light-emitting element may be a light-emitting diode, a laser diode, or other current driven light-emitting elements. The stability of the output optical power is an important performance criterion of the optical module. In the related art, in order to maintain the stability of the output optical power, generally, by tracking a backlight-converted backlight current through a backlight detector (such as a photodiode) inside the optical transmitting assembly, the output optical power of the optical transmitting assembly is monitored, so the backlight current is also often called a monitoring current. Once the monitoring current changes, it is determined that the output optical power has changed and, at this time, the driving current of the optical transmitting assembly is adjusted accordingly to perform optical power control, so as to maintain stable output optical power.

However, when the ambient temperature changes, the tracking characteristics of the backlight detector (which may be expressed by the change of the monitoring current with the output optical power) may be changed. For example, when the temperature changes from T1 to T2, although the output optical power of the optical transmitting assembly may change from P to P', the backlight detector may still monitor the same monitoring current $I_m$, which results in a tracking error. In the related art, the tracking error is often simplified as the difference between the output optical powers when the optical transmitting assembly tracks the same monitoring current under two different temperature conditions. Therefore, if a certain temperature is used as a reference temperature, the change in the tracking error at different temperatures also reflects the change in the output optical power.

However, in the optical module of related art, for the convenience of implementation, the temperature change is generally not considered (that is, the ambient temperature is defaulted to a predetermined temperature), and a fixed preset tracking characteristic curve is used to characterize the tracking characteristic of the backlight detector, that is, as long as the monitoring current $I_m$ is the same, the optical power P emitted by the optical transmitting assembly is considered to be the same, and vice versa. In this way, when the ambient temperature changes from the predetermined temperature to other temperatures, if the optical module always uses the preset tracking characteristic curve (corresponding to a single predetermined temperature) to determine the output optical power of the optical transmitting assembly from the monitoring current, the output optical power of the optical transmitting assembly may be misdetermined due to the influence of the tracking error, which leads to an error in the control of the driving current of the optical transmitting assembly, so it is difficult to achieve the purpose of maintaining the stability of the optical power.

Related methods of optical module temperature compensation include the scaling method, thermistor compensation method, and three-temperature fitting method. The scaling method uses a curve compensation manner, but it must provide many sets of experimental curves with a huge consumption. The thermistor compensation method uses the thermistor to compensate, but it requires welding the thermistor, such that the accuracy improvement is limited and the data is inaccurate. The three-temperature fitting method fits a universal calibration curve by testing the power of the optical module at three temperature points, normal temperature (25° C.), high temperature, and low temperature, by taking points; however, the employed test platform is complex, the test time is long, and a unified standard is lacking.

The inventor realized that if the preset tracking characteristic used in the optical module is set as the tracking characteristic of the reference temperature, by compensating the tracking error at the other temperatures relative to the reference temperature, that is, the monitoring current at other temperatures is calibrated to the monitoring current at the reference temperature, even if the optical module is based on a single tracking characteristic curve, it may correctly determine the change of the output optical power and realize effective automatic power control. Because the optical transmitting assembly may maintain the stability of the output optical power at different temperatures, temperature compensation is achieved thereby.

FIG. 1 illustrates a schematic structural view of an optical module according to an embodiment of the present disclosure. The optical module 100 includes an optical transmitting assembly 110 and a driver 120.

The optical transmitting assembly 110 is configured to emit an optical signal based on the driving current to output optical power. In normal operation, when the driving current through the optical transmitting assembly 110 exceeds a threshold current Ith, the optical transmitting assembly 110 may generate and maintain a continuous optical power output. When the difference between the driving current and the threshold current Ith is relatively stable, the optical transmitting assembly 110 may maintain a substantially stable output optical power. When a modulation current used to drive the optical transmitting assembly 110 is adapted to a bias current and the threshold current, the optical signal emitted by the optical transmitting assembly 110 may be maintained to have a relatively stable extinction ratio. In some embodiments, the optical transmitting assembly 110 may include a light-emitting element such as a light-emitting diode LED, a semiconductor laser diode LD, or the like. In an example, the optical transmitting assembly 110 may include a VCSEL laser (Vertical Cavity Surface Emitting Laser), an FP laser (Fabry-Perot laser), a DFB laser (Distributed Feedback Laser), or the like.

The driver 120 includes a calibration circuit 122 and a driving current setting circuit 124. The calibration circuit 122 is configured to obtain an original monitoring current feedback value $MONDAC_{before}$ corresponding to a monitoring current of the optical transmitting assembly 110; and obtaining a tracking error value TE of a current temperature relative to the reference temperature, and linearly calibrating the original monitoring current feedback value $MONDAC_{before}$ based on the tracking error value TE to obtain a calibrated monitoring current feedback value $MONDAC_{after}$.

Herein, the tracking error value TE of the current temperature relative to the reference temperature indicates a difference between the tracking characteristic of the current temperature and the tracking characteristic of the reference temperature. In some embodiments, the tracking characteristic is represented by a ratio of the output optical power to the monitoring current. Accordingly, the tracking error may be represented by a difference between the ratio of the output optical power to the monitoring current at the current temperature and the ratio of the output optical power to the monitoring current at the reference temperature. The tracking characteristic curve at the reference temperature is a tracking characteristic curve for setting the driving current on which the calibration circuit 122 is based.

The monitor current feedback value is a digital value corresponding to an analog monitor current. In the tracking characteristic curve at the reference temperature, there is a determined one-to-one correspondence between the monitoring current feedback value and the output optical power of the optical module. In some embodiments, the preset tracking characteristic curve adopted by the optical module may be used as the tracking characteristic curve at the reference temperature, the output optical power corresponding to the monitoring current feedback value may be found and monitored by the optical module according to the preset tracking characteristic curve, and the change of the output optical power may be determined accordingly to perform corresponding output optical power control.

The driving current setting circuit 124 is configured to set the driving current based on the calibrated monitoring current feedback value $MONDAC_{after}$ to control the output optical power of the optical signal emitted by the optical transmitting assembly. In some embodiments, the setting of the driving current includes a setting of the bias current and the modulation current. The output optical power may be kept stable by controlling the bias current, and the extinction ratio may be kept stable by controlling the modulation current.

According to a solution of the present disclosure, the setting of the driving current is based on the calibrated monitoring current using the tracking error value, that is, the monitoring current after temperature compensation, rather than a directly collected monitoring current. Due to the calibration, the collected monitoring current is mapped to the monitoring current at the reference temperature on which the driving current is adjusted, so that the driving current setting circuit may more accurately track the change in the output optical power, in order to reduce the output optical power control error. Because the control error is reduced, the optical transmitting assembly may output a stable output optical power. In other words, because the output optical power remains stable relative to temperature changes, temperature compensation for the output optical power is achieved.

In one embodiment, the original monitoring current feedback value $MONDAC_{before}$ is obtained by collecting an analog value $I_m$ of the monitoring current of the optical transmitting assembly 110 and performing analog-to-digital conversion on the analog value Im. In another embodiment, the original monitoring current feedback value $MONDAC_{before}$ is a digital value that varies linearly with the analog value $I_m$ of the monitoring current. Exemplarily, the original monitoring current feedback value $MONDAC_{before}$ is a digital value implemented based on a specific circuit and having a linear relationship with the analog value $I_m$ of the monitoring current.

In one embodiment, initially, the calibration circuit 122 may obtain a tracking error initial value $TE_0$ as the tracking error value TE of the current temperature. The tracking error initial value $TE_0$ may be set as the tracking error of an actual tracking characteristic of the optical module at a certain temperature relative to the tracking characteristic of a reference temperature (for example, the preset tracking characteristic adopted by the optical module). The tracking error initial value $TE_0$ may be measured according to the characteristics of the internal devices (mainly including the optical transmitting assembly) of the optical module. Optionally, the tracking error initial value $TE_0$ may be provided by the manufacturer of the optical module according to the characteristics of the internal devices of the respective optical module and according to a custom test algorithm, and an initial monitoring current feedback value $MONDAC_0$ corresponding to the tracking error initial value $TE_0$ for characterizing a predetermined output optical power may be provided. The calibrating of the monitoring current feedback value may be started from $TE_0$ and the initial monitoring current feedback value $MONDAC_0$. In some embodiments, since an initial operating temperature of the device may be 25° C., the TE value at a test environment temperature of the device of 25° C. may be used as $TE_0$, and the corresponding initial monitoring current feedback value $MONDAC_0$ at this time may be preset for characterizing the output optical power of 1 dBm.

In other embodiments, the calibration circuit 122 may also obtain the tracking error value TE of a certain temperature range corresponding to the current temperature as the tracking error value TE of the current temperature. The temperature range may be, for example, high temperature, room temperature (for example, 20° C.-25° C.), low temperature, and the like, or temperature sections divided according to predetermined intervals, or temperature sections with different intervals divided according to the main temperature range of the optical module during operation. Similarly, the tracking error value TE of a certain temperature range may be provided by the manufacturer of the optical module according to the characteristics of the internal devices of the respective optical module and according to a custom test algorithm. In some embodiments, the calibration circuit 122 may further calculate the resulting tracking error value TE of the current temperature based on the tracking error initial value $TE_0$ and the temperature change value. As described above, the change in the output optical power due to the tracking error may be approximated by a linear relationship, and thus the tracking error value TE of the current temperature may be a value that changes linearly with temperature starting from the tracking error initial value $TE_0$.

In some embodiments, the driver 120 may include a storage configured to store the tracking error initial value $TE_0$ and the initial monitoring current feedback value $MONDAC_0$. In these embodiments, the calibration circuit 122 obtains the tracking error initial value and the initial monitoring current feedback value $MONDAC_0$ from the storage and starts the calibration therefrom. In some embodiments, the storage may further store the tracking error values TE corresponding to different temperatures or different temperature ranges, or calculated tracking error values TE. As known, for example, the tracking error value TE may be obtained by measuring the output optical power of the optical transmitting assembly at different temperatures.

In some embodiments, the output optical power of the optical module has a predetermined normal operating range, and accordingly, the monitoring current feedback value MONDAC has a corresponding effective value range. As such, when the monitoring current feedback value MONDAC exceeds the value range (which indicates that the output optical power may have exceeded the normal operating range), the tracking error value TE may further be adjusted (for example, increased or decreased) in a stepwise manner to maintain the monitoring current feedback value MONDAC within the value range, which accordingly indicates that the output optical power is also within the normal operating range.

In some embodiments, the calibrated monitoring current feedback value $MONDAC_{after}$ may be converted to the corresponding analog value by digital/analog conversion.

In one embodiment, the driver 120 may be implemented as a circuit in which an analog circuit is combined with a micro-control circuit (for example, a microcontroller MCU).

In one embodiment, the linearly calibrating is performed by the calibration circuit 122 according to Equation (1):

$$MONDAC_{after} = \frac{MONDAC_{before}}{10^{\left(\frac{TE}{10}\right)}} \quad (1)$$

wherein, TE is the tracking error value, $MONDAC_{before}$ is the monitoring current feedback value before calibration, that is, the original monitoring current feedback value, and $MONDAC_{after}$ is the calibrated monitoring current feedback value. Exemplarily, TE represents a ratio of the output optical power at the current temperature to the output optical power at the reference temperature under the same monitoring current.

Exemplarily, in one implementation manner, the operation of Equation (1) is performed by the calibration circuit 122 using an 8-bit register and a shifter.

Optionally, the calibration circuit may include a temperature sensor, in order to sense the current temperature. Alternatively, the calibration circuit may also obtain the current temperature outside the optical module.

Figure 2:
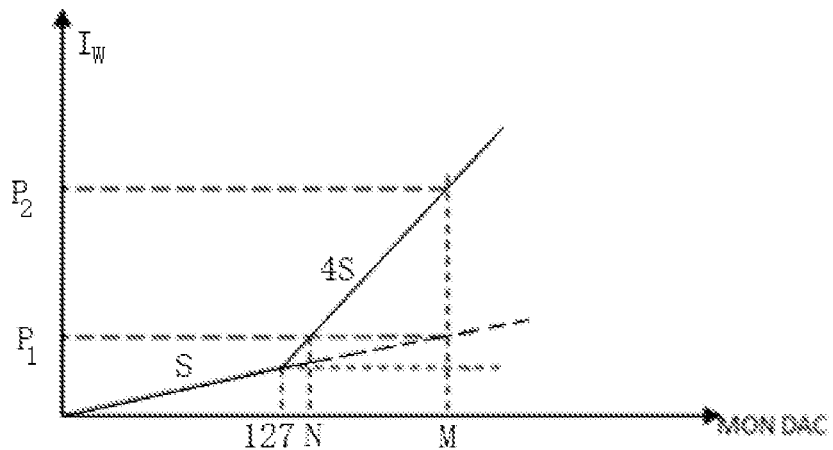
FIG. 2 illustrates a calibration curve according to an exemplary embodiment of the present disclosure.

FIG. 2 shows a calibration curve corresponding to Equation (1), which may correspond to the preset tracking characteristic curve of the optical module, that is, a curve to be calibrated. Here, the X axis (MONDAC axis) represents the monitoring current feedback value MONDAC; the Y axis ($I_w$ axis) represents the output optical power P of the optical module or the operating current $I_w$ of the optical module. As shown in FIG. 2, there is an approximately linear function between the monitoring current feedback value MONDAC and the output optical power. When the monitoring current feedback value MONDAC is less than a specific value, it may be considered that the output optical power of the optical module always changes according to a first slope with respect to the monitoring current feedback value. When the monitoring current feedback value is greater than the specific value, the output optical power of the optical module changes according to a second slope with respect to the monitoring current feedback value. That is, the specific value corresponds to a slope sudden change point.

Exemplarily, the 8-bit (that is, a range of 0~127) register may be used to store the monitoring current feedback value MONDAC, and the 8-bit register is disposed such that the maximum value (that is, 127) thereof corresponds to the slope sudden change point. It can be understood that when the MONDAC value is greater than 127, two 8-bit registers may be used. In an example, the first slope is S and the second slope is 4S, that is, the second slope is 4 times the first slope.

FIG. 2 exemplarily shows two points N and M on the x-axis (MON DAC axis), which respectively represent two different monitoring current feedback values MONDACs. The monitoring current feedback value N corresponds to the output optical power $P_1$, and the monitoring current feedback value M corresponds to the output optical power $P_2$.

It is assumed that: at temperature T1, when the optical module outputs the desired optical power $P_2$, the collected original monitoring current feedback value is M. Considering the case where the tracking error occurs when the temperature rises to T2, that is, the following situation may occur: although the output optical power of the optical module has decreased to $P_1$, the monitoring current feedback value M is still collected. At this time, if the collected original monitoring current feedback value is not calibrated, according to the tracking characteristic curve shown in the drawing, because the monitoring current feedback value has not changed, the optical module mistakenly believes that the current output optical power is still maintained at the desired optical power $P_2$, and therefore the drive current is not adjusted, so that the phenomenon of unstable output optical power may occur. By the solution according to the present disclosure, the monitoring current feedback value may be calibrated, for example, from M to N, such that the optical module correctly recognizes the change of the output optical power based on the change of the monitoring current feedback value, thereby adjusting the driving current to maintain the output light power stable. As such, the output optical power maintains stable with respect to temperature changes, thereby achieving temperature compensation for the optical module.

The inventors recognize that the internal environment of a wearable device is different from the conventional environment used by network operators. Specifically, the wearable device has the two following characteristics: 1) because the space is relatively closed, the ventilation and heat dissipation are not smooth, and the actual application temperature is high; 2) because the space is limited, the working environment is clean and the noise is low, and the transmission signal quality is good. These two characteristics lead to the fact that, for the wearable device, the output optical power of the optical module changes relatively slowly with respect to the temperature, and thus the compensation range does not need to be too large.

In one embodiment, the compensation range may be narrowed for the characteristics of the wearable device, and thus the linearly calibrating may performed by the calibration circuit 122 using Equation (2):

$$MONDAC_{after} = 31 - \left(31 - \frac{MONDAC_{before}}{10^{\left(\frac{TE}{10}\right)}}\right) \times 4 \quad (2)$$

wherein, TE is the tracking error value, $MONDAC_{before}$ is the monitoring current feedback value before calibration, that is, the original monitoring current feedback value, and $MONDAC_{after}$ is the calibrated monitoring current feedback value. Exemplarily, TE represents a ratio of the output optical power at the current temperature to the output optical power at the reference temperature under the same monitoring current.

In this embodiment, since the compensation range is narrowed, the obtained MONDAC may be represented by 5 bits. Exemplarily, in one implementation manner, a 5-bit register and a shifter may be used to complete the operation of Equation (2) to achieve temperature compensation for the optical power.

Alternatively, because the implementation of the binary multiplication in a digital circuit is performed by the shifter and the operation of "x4" is equivalent to shifting left by 2 bits, and because there is no need to retain the previous MONDAC value when implementing the operation of Equation (2), that is, the operation result may be overwritten, in another embodiment, a combination of the 5-bit register and the shifter may be replaced, and a single register (the minimum unit of the register may be 8-bit) is used to complete the calculation of Equation (2). That is, in the case of the 5-bit MONDAC value, since the 8-bit register has 3 bits in addition to 5 bits for storing the MONDAC value, these 3 bits may be directly shifted and occupied to implement the binary multiplication. This may further simplify operations and save storage space. Moreover, this iterative operation algorithm implementation guarantees the optimal operation speed of CPU-type processors, and only the MCU (micro-control circuit) platform may complete real-time operations and achieve tracking compensation without MONDAC fitting curves and look-up tables.

Figure 3:
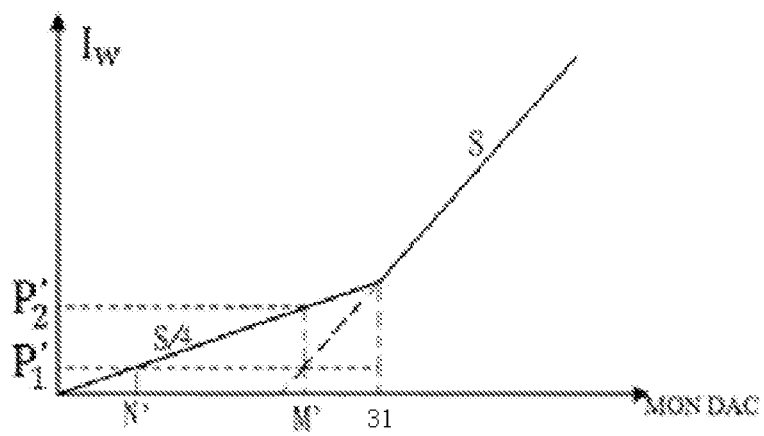
FIG. 3 illustrates a calibration curve according to another exemplary embodiment of the present disclosure.

FIG. 3 shows a calibration curve corresponding to Equation (2). In FIG. 3, similar to FIG. 2, $P_x$ is the output optical power, $I_w$ is the operating current of the optical module, and MONDAC is the monitoring current feedback value. Here, the 5-bit register (that is, a storage range of 0~31) is used to store the monitoring current feedback value, and the abscissa 31 represents the maximum value of the 5-bit register, which is set to the MONDAC value corresponding to a sudden change in slope.

FIG. 3 also exemplarily shows two points N' and M' on the x-axis (MON DAC axis), which respectively represent two different monitoring current feedback values MONDACs and respectively correspond to optical powers $P_1$' and $P_2$'. Compared to FIG. 2, as shown in FIG. 3, the slope before the slope sudden change point is S/4 and the slope after the slope sudden change point is S, that is, the output optical power changes more slowly, compared to the change of the monitoring current feedback value.

It can be seen from FIG. 3 that the monitoring current feedback value may be calibrated from M' to N' according to the solution of Equation (2), so that the optical module may track that the output optical power is actually $P_2$' instead of $P_1$', and thus the corresponding adjustment of the drive current is performed. Since the slope shown in FIG. 3 is S/4, that is, the output optical power changes slowly, the compensation range is relatively small.

According to the characteristics of the wearable device, the embodiment of the present disclosure realizes a relatively small compensation range, and may realize real-time operations, thereby simplifying operations and saving storage space.

A schematic structural view of a circuit of an optical module is exemplarily provided below, in order to further explain and illustrate the structure and principle of the optical module provided by the present disclosure.

Figure 7:
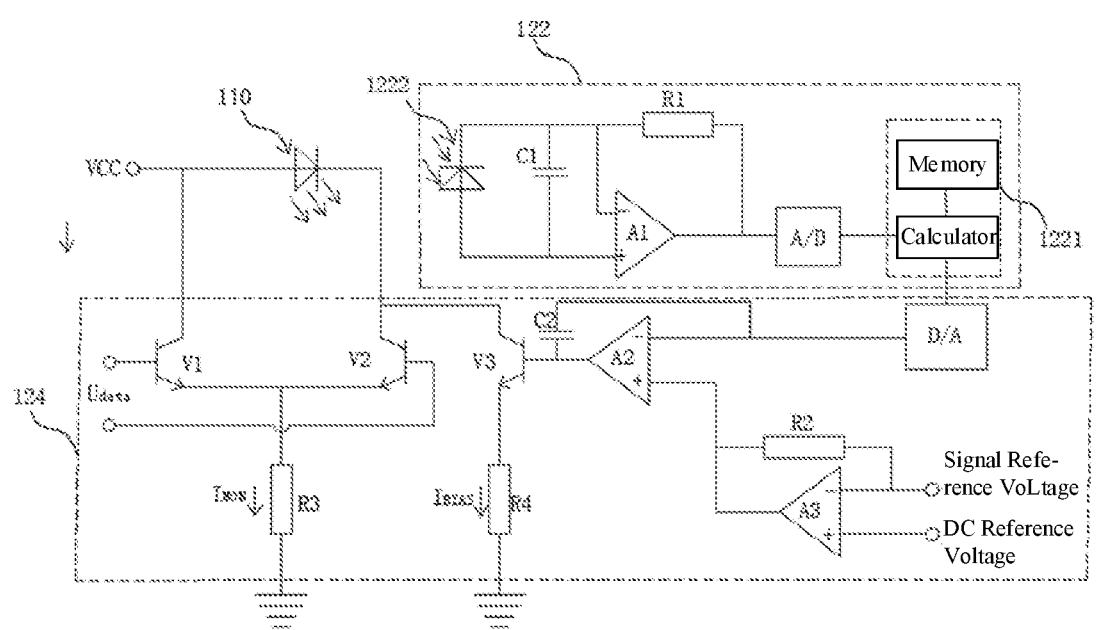
FIG. 7 illustrates a schematic structural view of an optical module according to an embodiment of the present disclosure.

In this example, as shown in FIG. 7, the optical module includes a light-emitting diode as an optical transmitting assembly 110, and a driver 120 composed of a calibration circuit 122 and a driving current setting circuit 124.

Wherein the calibration circuit 122 may include a photodiode 1222 for receiving a backlight and generating a monitoring current Im according to the backlight, an amplifier A1 for amplifying the monitoring current Im, an analog-to-digital converter (A/D) for converting an amplified result of the monitoring current Im into a digital signal, and a microcontroller (MCU, Micro-Control Circuit) 1221. The photodiode 1222 is configured to generate the monitoring current Im under the backlight, and after the monitoring current is amplified by the amplifier A1, it is converted into an original monitoring current feedback value $MONDAC_{before}$ of a monitoring current by the analog-to-digital converter. The microcontroller 1221 includes: a memory, in which tracking error values of different temperatures relative to a reference temperature are stored; and a calculator, for obtaining the tracking error value TE of a current temperature relative to the reference temperature from the memory according to the current temperature, obtaining the original monitoring current feedback value $MONDAC_{before}$ of the monitoring current from the analog-to-digital converter, and then obtaining the calibrated monitoring current feedback value $MONDAC_{after}$ according to TE and $MONDAC_{before}$ through calculation. As such, the calibration circuit 122 is a circuit combining an analog circuit and a control circuit, for obtaining the original monitoring current feedback value $MONDAC_{before}$ corresponding to the monitoring current of the optical transmitting assembly, for obtaining the tracking error value TE of the current temperature relative to the reference temperature, and for calibrating the original monitoring current feedback value $MONDAC_{before}$ based on the tracking error value TE to obtain the calibrated monitoring current feedback value $MONDAC_{after}$.

The driving current setting circuit 124 may include a data voltage input circuit, a modulation current circuit, a bias current circuit, an amplifier A3 for providing a reference voltage $V_{ref}$, and a digital-to-analog converter (D/A) for converting the calibrated monitoring current feedback value $MONDAC_{after}$ into an analog signal, and a comparator A2 for comparing a calibrated analog signal converted from $MONDAC_{after}$ with the reference voltage $V_{ref}$. Wherein the data voltage input circuit includes a first triode V1 and a second triode V2, and wherein a collector of the first triode V1 and a collector of the second triode V2 are respectively connected to an input terminal and an output terminal of the optical transmitting assembly 110, a base of the first triode V1 and a base of the second triode V2 constitute a data voltage input port, and an emitter of the first triode V1 and an emitter of the second triode V2 are respectively used to be electrically connected to a third resistor R3. The input terminal of the optical transmitting assembly 110 is also electrically connected to a power supply voltage VCC. The modulation current circuit includes the third resistor R3, one terminal of the third resistor R3 is electrically connected to the emitter of the first triode V1 and the emitter of the second triode V2, and the other terminal thereof is electrically connected to a ground wire for providing a path for the modulation current $I_{MON}$. The bias current circuit includes a third triode V3 and a fourth resistor R4, wherein a collector of the third triode V3 is electrically connected to the output terminal of the optical transmitting assembly 110, and an emitter of the third triode V3 is used to be electrically connected to the input terminal of the fourth resistor R4, and an output terminal of the fourth resistor R4 is used to be electrically connected to the ground line. The bias current circuit is used to adjust a bias current $I_{BIAS}$ passing through the optical transmitting assembly 110 under the control of a base of the third triode V3, wherein the modulation current $I_{MON}$ and the bias current $I_{BIAS}$ form a driving current of the optical module. An input terminal of the digital-to-analog converter (D/A) is electrically connected to an output terminal of the microcontroller 1221, for converting $MONDAC_{after}$ into a calibrated analog signal. Two input terminals of the comparator A2 are electrically connected to an output terminal of the digital-to-analog converter (D/A) and an output terminal of the amplifier A3, respectively, an output terminal of the comparator A2 is electrically connected to the base of the third triode V3, and two input terminals of the amplifier A3 are respectively input with a signal reference voltage and a DC reference voltage. In this way, the amplifier A3 may output the reference voltage $V_{ref}$ according to the signal reference voltage and the DC reference voltage, and the comparator A2 may output a control signal according to the reference voltage $V_{ref}$ and the calibrated analog signal, and the control signal is applied to the base of the third triode V3 to adjust the bias current $I_{BIAS}$ passing through the optical transmitting assembly 110. As such, the driving current setting circuit 124 may set the driving current based on the calibrated monitoring current feedback value $MONDAC_{after}$ to control the output optical power of the optical signal emitted by the optical transmitting assembly.

As such, in the optical module of this example, the driver 120 is presented as a circuit combining an analog circuit and a micro-control circuit.

Figure 4:
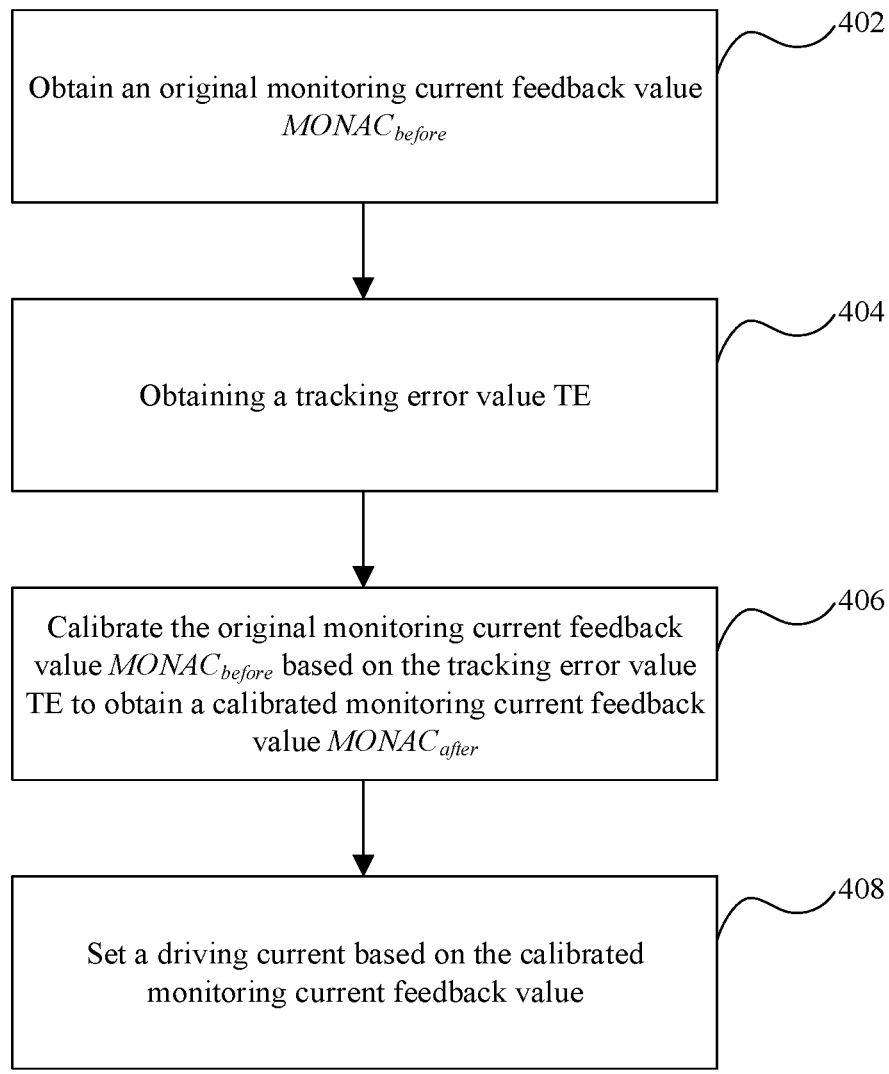
FIG. 4 illustrates a method for driving an optical module.

FIG. 4 illustrates a method for driving an optical module according to an embodiment of the present disclosure, for implementing temperature compensation and output optical power control of the optical module. The method for driving the optical module includes:

In step 402, an original monitoring current feedback value $MONDAC_{before}$ corresponding to a monitoring current of an optical transmitting assembly 110 is obtained. Optionally, the original monitoring current feedback value may be obtained by collecting the monitoring current of the optical transmitting assembly. In one embodiment, the monitoring current may be the photocurrent of a photodiode given a reverse voltage of the photodiode. The original monitoring current feedback value may be obtained by an analog-to-digital conversion from an analog value of the collected monitoring current.

In step 404, a tracking error value TE of a current temperature relative to a reference temperature is obtained. In one embodiment, initially, a tracking error initial value and a corresponding initial monitoring current feedback value may be obtained, and a calibration operation may be started therefrom. Alternatively, the tracking error initial value may be provided by the manufacturer and stored in advance in the optical module, for example, in a storage of the driver.

In step 406, the original monitoring current feedback value $MONDAC_{before}$ is calibrated based on the tracking error value TE to obtain a calibrated monitoring current feedback value $MONDAC_{after}$. Optionally, the original monitoring current feedback value $MONDAC_{before}$ is linearly calibrated based on the tracking error value TE to obtain the calibrated monitoring current feedback value $MONDAC_{after}$.

In one embodiment, the linearly calibrating is performed based on following Equation:

$$MONDAC_{after} = \frac{MONDAC_{before}}{10^{(\frac{TE}{10})}}.$$

In another embodiment, the linearly calibrating is performed based on following Equation:

$$MONDAC_{after} = 31 - \left(31 - \frac{MONDAC_{before}}{10^{(\frac{TE}{10})}}\right) \times 4.$$

In step 408, the driving current is set based on the calibrated monitoring current feedback value $MONDAC_{after}$ to control the output optical power of the optical transmitting assembly. In an example, the optical module may control the increase or decrease of the output optical power of the optical transmitting assembly by setting a bias current and/or a modulation current for driving the optical transmitting assembly, so as to keep the performance index of the optical module stable.

With the optical module according to the embodiment of the present disclosure, during the temperature change, the monitoring current feedback value used for adjusting the performance index of the optical module is calibrated using the tracking error. Since the calibrated monitoring current feedback value enables the optical module to more accurately determine the change in the output optical power of the optical module, this enables the automatic power control of the optical module (for example, the adjustment of the drive current) to better adapt to change in the output optical power, thereby maintaining the stability of the output optical power of the optical module with respect to temperature changes. This achieves temperature compensation for the optical module and improves the performance of the optical module.

Experiments show that the output optical power of the optical module using the solution of the embodiment of the present disclosure is stable at different temperatures. This shows that it is feasible and effective to implement power compensation by compensating the tracking error value TE.

Figure 5:
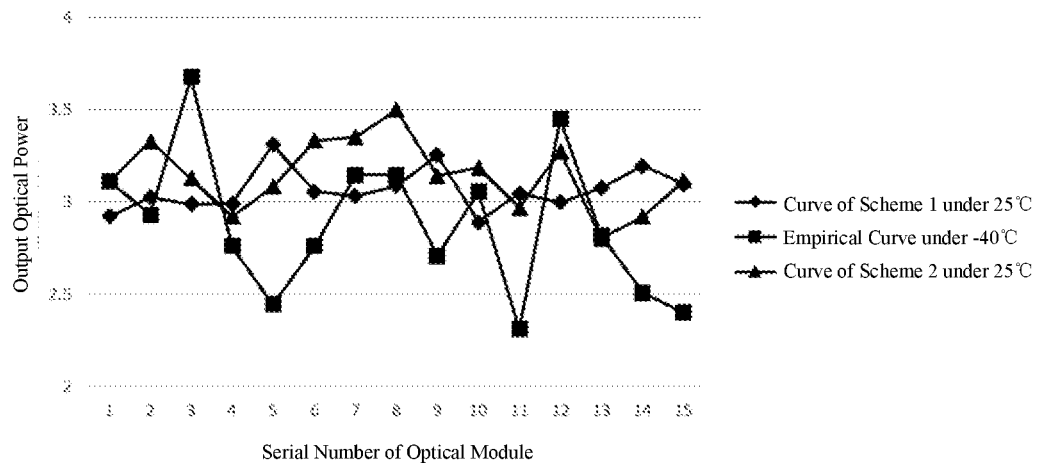
FIG. 5 illustrates the comparison of curves for output optical power of an optical module using different schemes.

FIG. 5 illustrates output optical power curves of 15 optical modules tested after applying a solution according to an embodiment of the present disclosure. The relationship between the temperature of the assembly and the temperature of the optical module in the test environment is exemplary shown in Table 1.

TABLE 1 relationship between the temperature of the assembly and the temperature of the optical module

| | | | |
|---|---|---|---|
| the temperature of the optical transmitting assembly | −40° C. | 25° C. | 95° C. |
| the temperature of the optical module | −36° C. | 36° C. | 114° C. |

In FIG. 5, the respective points on a 25° C. scheme 1 curve represent the output optical power of each optical module after calibration using Equation (1) when the operating temperature is 25° C., and the respective points on a 25° C. scheme 2 curve represent the output optical power of each optical module after calibration using Equation (2) when the operating temperature is 25° C.

As shown in the drawing, the output optical power after calibration according to the solution of the embodiment of the present disclosure remains stable, and the performance of the optical module is improved.

In addition, compared to the 25° C. scheme 1 curve, in some optical modules in the 25° C. scheme 2 curve, such as the optical modules 1-3, 6-8, 10, and 12, the output optical power is increased. This shows that after temperature compensation according to Equation (2), the output optical power value of the optical module is improved at 25° C. The power modules without power increase are to balance the contradiction between the extinction ratio and the power; and the performance of the optical module is guaranteed to be optimal, since the extinction ratio and the improvement of the optical power are appropriately compromised according to the solution of the present disclosure.

As shown, as a comparison, a −40° C. experience curve is also given in FIG. 5, and −40° C. is the temperature of a low temperature test. Compared to the curve at low temperature, the 25° C. scheme 1 curve and the 25° C. scheme 2 curve are more stable, which indicates that the solution of the embodiment of the present disclosure is stable and may be applied in practice.

Table 2 shows data information including the output power, monitoring current, threshold current, output current, and the like collected by the optical module of the present disclosure during the test. The data information shown is obtained by averaging each optical module.

TABLE 2

Test data of the optical module

| | Temperature | | |
|---|---|---|---|
| Data | −40° C. | 25° C. | 95° C. |
| Output power (μW) | 3206 | 3197 | 3197 |
| Monitoring current (μA) | 344 | 369 | 394 |
| Threshold current (mA) | 2.812 | 6.66 | 31.228 |
| Output current (mA) | 20.017 | 28.379 | 87.801 |

Herein, the output power refers to the optical power output from the light-emitting diode when the preset current reaches a predetermined modulation current. The monitoring current refers to the photocurrent value of the photodiode when the reverse voltage of the photodiode is given, under the specified light-emitting diode output power. The threshold current is the current that the light-emitting diode must reach for normal operation. The output current refers to the working current corresponding to the output power.

It can be seen from Table 2 that as the temperature increases, the threshold current of the optical module changes greatly. After applying the solution of the embodiment of the present disclosure, the drive current is adjusted based on the calibrated monitoring current feedback value, so that the output power of the optical module remains substantially stable under different temperature conditions of −40° C., 25° C., and 95° C., thereby improving the performance of the optical module.

Figure 6:
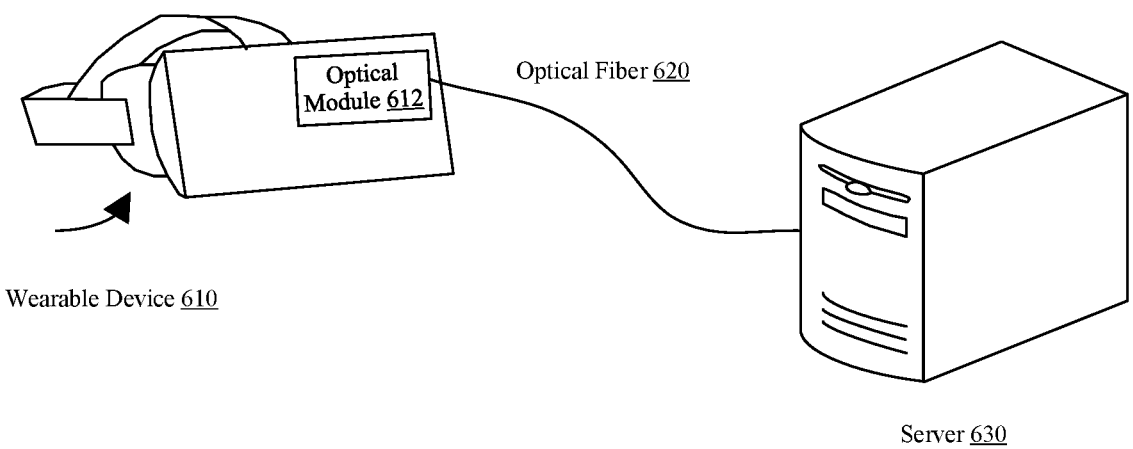
FIG. 6 illustrates an exemplary schematic view of a wearable device according to an embodiment of the present disclosure.

FIG. 6 illustrates an exemplary schematic view of a wearable device according to an embodiment of the present disclosure. The wearable device may include VR and AR devices. However, as understood by those skilled in the art, the wearable device also include other types of personal interaction devices and other small devices developed in the future that require optical communication technology.

As shown in FIG. 6, the wearable device 610 includes an optical module 612 according to an embodiment of the present disclosure, and communicates through the optical module 612. In some embodiments, the wearable device is connected to an optical fiber 620, for example, through the optical module 612 for high-speed data stream transmission with a server 630 or other processors.

In some embodiments, when the optical module is applied to the VR device, the driver of the optical module may be integrated with the circuit of the VR device as a whole, and the optical transmitting assembly (such as a laser and its internal integrated chip) is directly welded to a circuit board of the VR device.

Various embodiments of the present disclosure may be implemented by using hardware units, software units, or a combination thereof. Examples of the hardware units may include devices, components, processors, microprocessors, circuits, circuit elements (for example, transistors, resistors, capacitors, inductors, and the like), integrated circuits, application specific integrated circuits (ASICs), programmable logic devices (PLD), digital signal processors (DSPs), field programmable gate arrays (FPGAs), memory cells, logic gates, registers, semiconductor devices, chips, microchips, chipsets, and the like. Examples of software units may include software components, programs, applications, computer programs, application programs, system programs, machine programs, operating system software, middleware, firmware, software modules, routines, subroutines, functions, methods, processes, software interfaces, application program interfaces (APIs), instruction sets, calculation codes, computer codes, code segments, computer code segments, words, values, symbols, or any combination thereof. The decision as to how the embodiment is implemented may vary for any given implementation, depending on any number of factors such as the desired calculation rate, power level, heat resistance, processing cycle budget, input data rate, output data rate, memory resource, data bus speed, and other design or performance constraints.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the application are not necessarily all referring to the same embodiment.

Additionally, in the above detailed description, it can be seen that, to simplify the disclosure, various features are grouped together in a single embodiment. This method of disclosure is not to be interpreted as reflecting an intention that the claimed embodiments require more features than are expressly recited in each claim. Rather, as the following claims reflect, the subject matter of this disclosure is less than all features of a single disclosed embodiment. Accordingly, the following claims are hereby incorporated into the detailed description, with each claim standing on its own as a separate embodiment. Moreover, the terms "first", "second", "third", and the like are used only as labels and are not intended to impose numerical requirements on their objects.

Although the subject matter is described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An optical transmitter, comprising:
an optical transmitting assembly configured to emit an optical signal based on a driving current; and
a driver comprising:
a calibration circuit configured to obtain an original monitoring current feedback value $MONDAC_{before}$ corresponding to a monitoring current of the optical transmitting assembly, obtain a tracking error value TE of a current temperature relative to a reference temperature, and calibrate the original monitoring current feedback value $MONDAC_{before}$ based on the tracking error value TE to obtain a calibrated monitoring current feedback value $MONDAC_{after}$; and
a driving current setting circuit configured to set the driving current based on the calibrated monitoring current feedback value $MONDAC_{after}$, to control an output optical power of the optical signal emitted by the optical transmitting assembly.

2. The optical transmitter according to claim 1, wherein the calibration circuit is configured to linearly calibrate the original monitoring current feedback value $MONDAC_{before}$ based on the tracking error value TE.

3. The optical transmitter according to claim 1, wherein the calibration circuit is configured to calibrate the original monitoring current feedback value $MONDAC_{before}$ based on the tracking error value TE to obtain the calibrated monitoring current feedback value $MONDAC_{after}$ by using the following equation:

$$MONDAC_{after} = \frac{MONDAC_{before}}{10^{\left(\frac{TE}{10}\right)}}.$$

4. The optical transmitter according to claim 1, wherein the calibration circuit is configured to calibrate the original monitoring current feedback value $MONDAC_{before}$ based on the tracking error value TE to obtain the calibrated monitoring current feedback value $MONDAC_{after}$ by using the following equation:

$$MONDAC_{after} = 31 - \left(31 - \frac{MONDAC_{before}}{10^{\left(\frac{TE}{10}\right)}}\right) \times 4.$$

5. The optical transmitter according to claim 1, wherein the driver is a circuit comprising a combination of an analog circuit and a micro-control circuit.

6. The optical transmitter according to claim 1, further comprising a storage configured to store the tracking error value TE, wherein the calibration circuit is configured to read the tracking error value TE from the storage.

7. The optical transmitter according to claim 1, wherein the original monitoring current feedback value $MONDAC_{before}$ is obtained by collecting an analog value $I_m$ of the monitoring current of the optical transmitting assembly and performing analog-to-digital conversion on the analog value $I_m$.

8. The optical transmitter according to claim 4, wherein the calibration circuit is configured to implement calculation of the calibrated monitoring current feedback value $MONDAC_{after}$ through use of a 5-bit register and a shifter.

9. The optical transmitter according to claim 4, wherein the calibration circuit is configured to implement calculation of the calibrated monitoring current feedback value $MONDAC_{after}$ through use of an 8-bit register and a shifter.

10. A method for driving an optical transmitter, comprising:
obtaining an original monitoring current feedback value $MONDAC_{before}$ corresponding to a monitoring current of an optical transmitting assembly of the optical transmitter;
obtaining a tracking error value TE of a current temperature relative to a reference temperature;
calibrating the original monitoring current feedback value $MONDAC_{before}$ based on the tracking error value TE to obtain a calibrated monitoring current feedback value $MONDAC_{after}$; and
setting a driving current based on the calibrated monitoring current feedback value $MONDAC_{after}$ to control an optical power output by the optical transmitting assembly.

11. The method according to claim 10, wherein the calibrating of the original monitoring current feedback value $MONDAC_{before}$ based on the tracking error value TE further comprises: linearly calibrating the original monitoring current feedback value $MONDAC_{before}$ based on the tracking error value TE.

12. The method according to claim 10, wherein the calibrating of the original monitoring current feedback value $MONDAC_{before}$ based on the tracking error value TE to obtain the calibrated monitoring current feedback value $MONDAC_{after}$ further comprises: calibrating the original monitoring current feedback value $MONDAC_{before}$ based on the tracking error value TE to obtain the calibrated monitoring current feedback value $MONDAC_{after}$ using the following equation:

$$MONDAC_{after} = \frac{MONDAC_{before}}{10^{\left(\frac{TE}{10}\right)}}.$$

13. The method according to claim 10, wherein the calibrating of the original monitoring current feedback value $MONDAC_{before}$ based on the tracking error value TE to obtain the calibrated monitoring current feedback value $MONDAC_{after}$ further comprises: calibrating the original monitoring current feedback value $MONDAC_{before}$ based on the tracking error value TE to obtain the calibrated monitoring current feedback value $MONDAC_{after}$ using the following equation:

$$MONDAC_{after} = 31 - \left(31 - \frac{MONDAC_{before}}{10^{\left(\frac{TE}{10}\right)}}\right) \times 4.$$

14. The method according to claim 10, wherein the obtaining of the tracking error value TE of the current temperature relative to the reference temperature further comprises reading the tracking error value TE from a storage of the optical transmitter.

15. The method according to claim 10, further comprising obtaining the original monitoring current feedback value $MONDAC_{before}$ by collecting an analog value $I_m$ of the monitoring current of the optical transmitting assembly and performing analog-to-digital conversion on the analog value $I_m$.

16. A wearable device, comprising:
an optical module, wherein the optical module comprises:
   an optical transmitting assembly configured to emit an optical signal based on a driving current; and
   a driver, comprising:
     a calibration circuit configured to obtain an original monitoring current feedback value $MONDAC_{before}$ corresponding to a monitoring current of the optical transmitting assembly, obtain a tracking error value TE of a current temperature relative to a reference temperature, and calibrate the original monitoring current feedback value $MONDAC_{before}$ based on the tracking error value TE to obtain a calibrated monitoring current feedback value $MONDAC_{after}$; and
     a driving current setting circuit configured to set the driving current based on the calibrated monitoring current feedback value $MONDAC_{after}$ to control an output optical power of the optical signal emitted by the optical transmitting assembly.

17. The wearable device according to claim 16, wherein the wearable device is a virtual reality device or an augmented reality device.

18. The wearable device according to claim 16, wherein the calibration circuit is configured to linearly calibrate the original monitoring current feedback value $MONDAC_{before}$ based on the tracking error value TE.

19. The wearable device according to claim 16, wherein the calibration circuit is configured to calibrate the original monitoring current feedback value $MONDAC_{before}$ based on the tracking error value TE to obtain the calibrated monitoring current feedback value $MONDAC_{after}$ using the following equation:

$$MONDAC_{after} = \frac{MONDAC_{before}}{10^{\left(\frac{TE}{10}\right)}}.$$

20. The wearable device according to claim 16, wherein the calibration circuit is configured to calibrate the original monitoring current feedback value $MONDAC_{before}$ based on the tracking error value TE to obtain the calibrated monitoring current feedback value $MONDAC_{after}$ using the following equation:

$$MONDAC_{after} = 31 - \left(31 - \frac{MONDAC_{before}}{10^{\left(\frac{TE}{10}\right)}}\right) \times 4.$$

* * * * *